United States Patent [19]

Davis

[11] Patent Number: 4,916,450
[45] Date of Patent: * Apr. 10, 1990

[54] RADAR SYSTEM FOR HEADWAY CONTROL OF A VEHICLE

[75] Inventor: John W. Davis, San Diego, Calif.

[73] Assignee: Radar Control Systems Corporation, San Diego, Calif.

[*] Notice: The portion of the term of this patent subsequent to Jun. 16, 2004 has been disclaimed.

[21] Appl. No.: 193,393

[22] Filed: May 12, 1988

[51] Int. Cl.$^4$ .................... G01S 13/93; G01S 13/42
[52] U.S. Cl. ........................................ 342/71; 342/109
[58] Field of Search ................................. 342/70–72; 367/909; 340/903, 904; 364/426.01, 426.04

[56] References Cited

U.S. PATENT DOCUMENTS

| | | | |
|---|---|---|---|
| 2,996,137 | 8/1961 | Yaohan Chu et al. | 342/71 |
| 3,689,882 | 9/1972 | Dessailly | 342/71 |
| 3,725,921 | 4/1973 | Weidman et al. | 342/70 |
| 3,898,652 | 8/1975 | Rashid | 342/71 |
| 4,072,945 | 2/1978 | Katsumata et al. | 342/70 |
| 4,073,359 | 2/1978 | Fujiki et al. | 342/71 |
| 4,543,577 | 9/1985 | Tachibava et al. | 367/909 |
| 4,673,937 | 6/1987 | Davis | 342/72 |

FOREIGN PATENT DOCUMENTS 2038132 7/1980 United Kingdom .................. 342/70

Primary Examiner—Thomas H. Tarcza
Assistant Examiner—Gilberto Barrón, Jr.
Attorney, Agent, or Firm—Frank D. Gilliam

[57] ABSTRACT

A radar system for monitoring the headway control distance between a vehicle equipped with a radar system of the present invention and a fixed or moving object of immediate concern in front thereof. The system employs an antenna positioned in front of the vehicle, transmitter and receiver circuits and signal processing circuits. A transmitted signal from the transmitter circuit when reflected back from an object of immediate concern is received by the receiver circuit and fed into conditioning circuits which separate the received signal into controlling signals that include the range or distance (R) to a detected object of concern, the closing rate (CR) to that object and the vehicle speed of movement (VS). Driving condition modifiers (±DM) such as traffic conditions and weather conditions, the level of which are manually chosen by the operator of the vehicle are combined with the received signals to constantly provide changing signals to dynamically determine a hazard level (HZL) which is compared to a preset reference level to 2 according to the mathematical formula or algorithm HZL=R+CR+VS±DM. The DMs, which combined collectively with define or replicate the operator's perceived safe drive conditions.

18 Claims, 2 Drawing Sheets

RADAR SYSTEM FOR HEADWAY CONTROL OF A VEHICLE

BACKGROUND OF THE INVENTION

This invention is an improvement to my prior invention covered by U.S. Pat. No. 4,673,937 and provides an enhancement thereto. The invention relates to radar devices and more particularly to an expert system for continuously and dynamically monitoring the headway between a vehicle and a stationary or moving object of immediate concern based on a practical driving mathematical formula or algorithm.

Preferably a vehicle radar system should always alert the driver in time to avoid a collision. However, in real-world traffic situations, this is not always possible. Curving roadways, cross traffic, and many other fast-changing situations make it physically impossible in many situations for the radar to always give the driver the time and distance needed for stopping. But alerting the driver just one second (e.g. 73 feet at 50 MPH) before impact can often provide enough time to steer around an obstacle, or at least allow some additional braking time. The system can provide seconds in many situations that may give drivers the extra time they need.

Some of the safety benefits a vehicle radar system can provide are:

Radar will be constantly on guard to act as a safety back-up for distracted drivers.

Radar should prevent many sideswipe accidents, especially when the road is straight or turns left.

Radar can help drivers establish and maintain safer driving margins in traffic situations.

Radar can respond very quickly in accident situations to alert drivers.

Radar, to be truly effective, must perform well enough to gain the driver's confidence. To be most effective and meaningful for a driver, the system should communicate in the same manner as a passenger would warn an unsafe driver. A passenger knows when a driver is unsafe and he will respond accordingly. If a driver is careless, a passenger may say something; if a collision is imminent, he may yell. The radar warning system should also communicate its measured level or interpretation of the hazardous situation and alert the driver in words and statements. The system can now say "look out", "be careful", and alert the driver in appropriate situations.

The primary control for vehicle safety will always be in the hands of the driver. However, when a driver is not paying attention, the radar will be working for him in many critical situations. This means it should not miss too many opportunities to avoid preventable accidents; yet it must not disturb the driver or passenger needlessly. Therefore, the output of the radar warning system should be focused toward keeping the driver attentive in hazardous and dangerous situations and alerting him to take action.

The complex, moving environment the vehicle radar sees, and must operate in, poses many difficulties for reliable and optimum system performance. With a small high-gain antenna mounted two feet above the roadway, many nearby objects must and will be seen by the radar system. Radar energy bounces around when it hits nearby objects, much like water from a nozzle would bounce back from a nearby object. A sensitive radar will see the road, cars, posts and any other nearby and distant objects in the radar beam. Some small, poorly shaped radar objects (referred to as targets) are hard to see. Other targets are very large, and some large targets can be seen miles away. The necessary dynamic operating range of the system must, therefore, be great to see both small and large targets. Many vehicle radar systems can only see or respond to larger targets at close range. A good short-range radar system must detect smaller targets and also work well when large targets are blindingly close. A radar can blind itself by its own return.

All of these environmental difficulties are manifested one way or another as signal problems such as distortion, saturation, multipath, multitarget, multibounce, and multiple returns. Other related problems are false alarms, radar blinding, electrical interference, road noises, vehicle noise, bounce and vibration, weather, and similar phenomena.

These environmental problems are some of the primary reasons why vehicle radar has been such a challenge to develop. Regardless of environmental restrictions, it is very important for a system to recover all the information available in the radar signal. The difficulties of extracting the information from a weak, saturated or distorted return signal have caused vehicle radar designers to look for alternate solutions.

The road performance of the vehicle radar antenna and the circuits that back it up must be very good in order to see smaller radar targets. The major factor in any vehicle radar system will be how well the radar sees and recognizes the weaker targets. Some objects, at times, appear almost invisible to the radar. The normal signal strength range or radar cross-section of these radar returns now varies about 50 DB. Some poor radar targets can be improved with ease, but detecting a small child will always be a challenge for any radar system.

Roadways are now enhanced with all types of visual aids to help the driver's vision. Radar visibility can also be enhanced by adding a radar reflecting device or material to existing vehicles and roadside markers. Visible light and radar images are comparable in many ways. Radar returns respond somewhat like looking at yourself in a mirror. A slight turn of the mirror and you image disappears, even though you can still see the mirror. Radar returns don't suddenly disappear like the visual image, but they do become very weak in many cases.

As vehicle radar becomes a reality, vehicles may have improved radar cross-sections, or they may be augmented with one or more radar reflectors to enhance their radar image. It takes a very small change to make poor radar targets many times stronger, especially at higher frequencies. A radar system should still be able to perform in the present automotive environment. However, when the roadway environment is improved for radar, it will be better for drivers as well.

The invention described and claimed in the '957 patent advanced the art of vehicle safety by a quantum leap and has been successfully tested under actual working environments to enhance the safety of vehicle travel by alerting the driver of that vehicle to headway dangers when the driver is distracted or otherwise unaware of impending danger of impact with an object either moving at a slower speed than the radar equipped vehicle or a stationary object of concern in the path of the radar equipped vehicle.

U.S. Pat. Nos. of interest that were cited in the prosecution of my prior patent above mentioned are as follows: 3,153,230 issued to Van Krevelen et al. in October 1964; 3,383,678 issued to Palmer in May 1968; 3,698,882 issued to Dessailly in September 1972; 3,725,921 issued to Weidman et al. in April 1973; 3,778,826 issued to Flannery et al. in December 1973; 4,366,546 issued to Tachibana et al. in May 1983.

The design for vehicle radar starts with a good antenna and microwave system that can detect small, complex targets. The antenna beam has to be sized, shaped and steered appropriately to cover a vehicle's changing headway. The detected signal is usually distorted as a result of complex multitarget returns. the signal, however, contains all the needed information such as closing rate, range, direction, signal coding, interference, and other data needed by the radar system.

Assuming that we have all the radar data, it must be conditioned and processed to determine how many feet (or seconds) a driver needs for accident prevention. Then the radar's external information is combined with the vehicle's internal data components (vehicle speed, steering, acceleration, stopping, etc.) plus the driver inputs to have all the inputs to make the radar system operational. The internal vehicle and driver inputs are referred to as driving monitors or driving modifications (DMs), which describes their function. If a radar system were in free space looking at a target ten miles away, no system modification would be necessary. However, in the ever-changing vehicle radar environment, where small and large objects are constantly passing nearby at various speeds, a different solution was needed and developed. The vehicle radar system design of this invention was adapted to the environment as well as to the vehicle usage.

Once the radar, vehicle and driver inputs are available, they are conditioned and then combined in a digital analog processor. After this data is in the microprocessor, the system can be programmed to fit the vehicle's driving situation to achieve the appropriate outputs for the driver.

The main output of the vehicle radar system is to alert the driver—who is the vehicle's ultimate safety device. The radar warning system is designed to keep the driver safer and to actively warn him in dangerous situations.

SUMMARY OF THE INVENTION

The instant invention further advances vehicle operation safety by providing a radar vehicle warning system that allows the vehicle operator to continue his or her normal safe driving habits under safe conditions as defined by a first or safe zone and warns that operator when his or her driving conditions go from the first safe zone to a second or hazard zone by providing a warning to the operator that the established safe driving conditions of the first zone are being exceeded by entry into the second zone and that impact with another object will occur unless the operator returns to a driving condition within the first safe zone. The warning is in sufficient time for the operator to correct the impact condition in a normal and expected manner by slowing or stopping the vehicle before impact or turning the vehicle into a new path of travel whereby the object is bypassed. This is accomplished by the radar system continually monitoring the forward path of travel of a vehicle equipped with the system of this invention and providing a warning to the vehicle operator if that driver's normal zone of danger for a given condition is exceeded. The system is designed to prevent needless disruption of the operator when the vehicle is not in a dangerous situation.

The invention is specifically directed to a vehicle borne expert radar system for alerting the vehicle operator of a dangerous vehicle condition in sufficient time for the operator of the vehicle to respond to that warning to avoid the dangerous condition, such as a collision with another object. The system gathers radar produced information directed to range of an object to the vehicle and the closing rate to that object. The radar produced information is then summed with driving condition modifiers, such as the vehicle forward speed, steering angle, acceleration and braking in a radar signal processor. A headway control algorithm weighs these various inputs to be summed at a value which is relative to each other and to the reference value according to their importance. When the algorithm produces a summed output signal level which exceeds a predetermined hazard reference level, the radar processing circuit provides an output signal for warning that operator of the dangerous condition and will continue to warn the driver more dramatically as the level of danger increases, ie. if the signal of the algorithm increases in a positive direction.

A principal object of this invention is to improve the operator's awareness to increase vehicle operator and passenger safety.

Another object of this invention is to produce an algorithm from radar and vehicle produced signals and for producing therefrom a signal that is representative of instantaneous driving conditions as well as the driving ability of a specific vehicle operator to provide no warning to the operator when safe driving conditions exist and ample warnings to the operator when an unsafe condition exists with the warnings increasing in their in emotional tones and/or volume as the danger level increases.

Another object of this invention is to electronically improve a vehicle operators awareness of unsafe conditions and help to maintain safe driving margins.

Still another object of the invention is to provide operator control of the safety margin which when is exceeded causes the radar to produce a warning.

The above and other objects, features and advantages of the present invention will become more apparent from the following description of the preferred embodiment thereof taken in conjunction with the accompanying drawing Figures.

BRIEF DESCRIPTION OF THE DRAWING FIGS.

Figure 1:
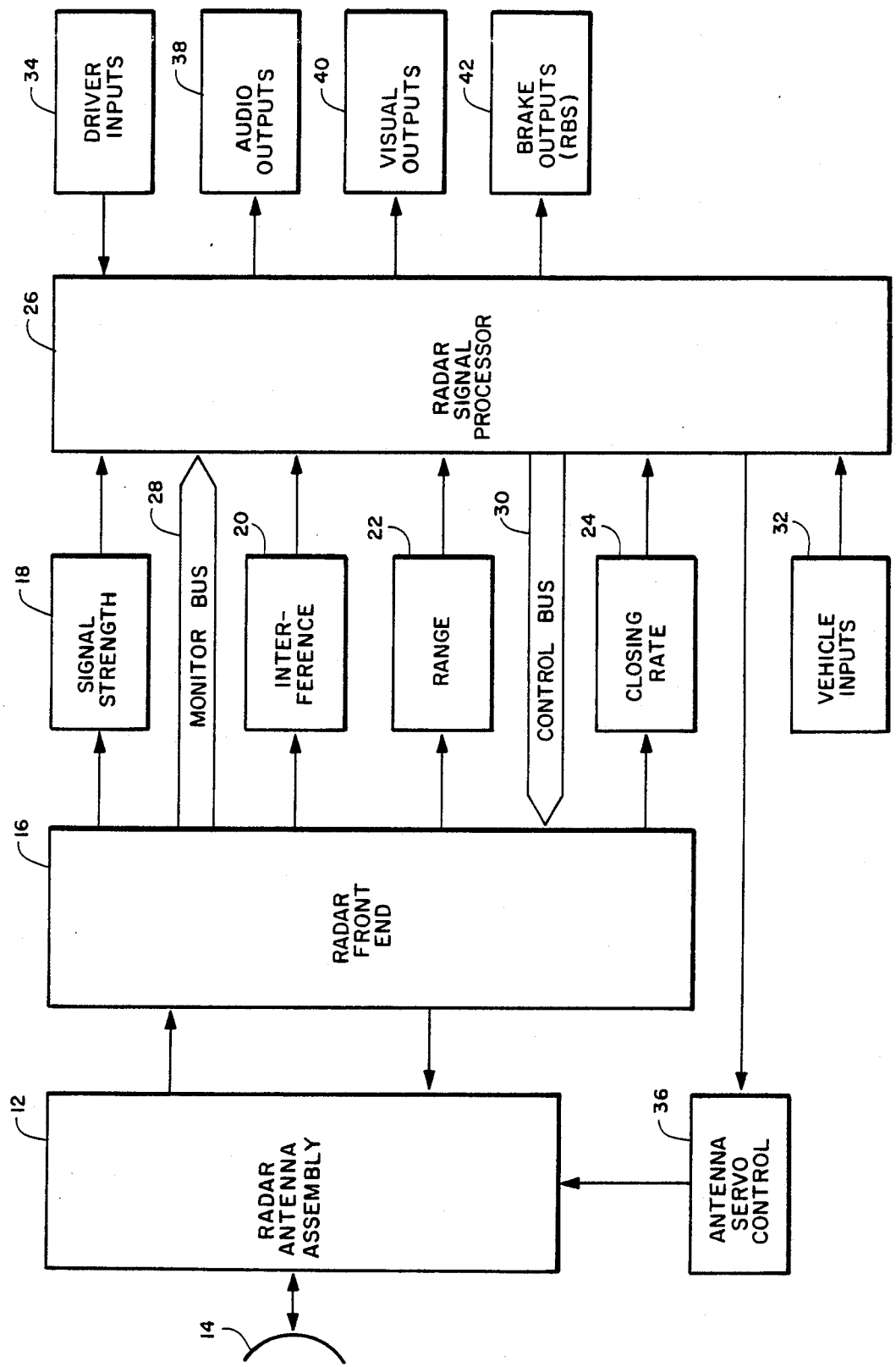
FIG. 1 is a block showing of a radar which utilizes the present invention.

DETAILED DESCRIPTION OF THE DRAWING FIGS.

Referring now to the various drawing Figures, FIG. 1 depicts a block diagram of a vehicle borne radar of this invention. A radar of the type used to practice this invention is fully described in my U.S. Pat. No. 4,673,937 issued on June 16, 1987, the disclosure of which is incorporated in its entirety by reference thereto.

Referring now specifically to FIG. 1, the radar system 10 is divided into several major assemblies. The antenna assembly 12 includes an antenna 14 of approximately 7 inches in diameter similar in size to an automobile headlight. The antenna is positioned on the outside of the vehicle to see forward of the normal direction of travel of the vehicle, such as, for example on the front of an automobile. In a preferred embodiment, the antenna has a beam width of 5 degrees at −3 DB, with side lobes and is steerable through 20 degrees left and right or by a servo positioner that appropriately maintains a constant cord height in turns in order to look at a spot two seconds ahead of the vehicle.

Located in the radar antenna assembly 12 are the active microwave components, including a Gunn diode, operating at a frequency of 24.15 GHz, and the mixer diode.

Positioned within the interior of the vehicle is a radar front end assembly 16 which contains the receiver and the signal conditioning circuits of the radar system. The signals from the radar receiver are detected and conditioned to produce signal strength information 18, interference information 20, range (R) 22 and closing rate (CR) 24 signals. The various signals are fed into a radar signal processor 26. A monitor bus 28 and a control bus 30 provide a signal flow control loop with signal flow in the direction of the arrow heads thereon.

Vehicle operating condition inputs 32 are also fed into the radar signal processor. The vehicle condition inputs include vehicle speed, steering, acceleration, stopping, etc. Driver inputs 34 are also fed into the radar signal processor 26. The driver inputs for example may include road conditions ie. wet, dry, ice or snow present, etc., traffic conditions, etc. or any other condition that would effect or alter the normal operation of the vehicle. If a steerable antenna is used an antenna servo control 36 is employed to move the antenna in the direction of the vehicle travel.

The radar signal processor 26 provides usable output signals for audio statements 38, visual indications 40, and brake outputs 42 where radar braking is utilized on the vehicle.

All radar system data will be processed by a microprocessor that will control the system's output commands. One advantage a radar system will have over the driver is the speed and quantity of data it can accurately process, and the ability to convert it into useful output commands. The radar console may become the "black box" for vehicle accidents because it will have all the radar and vehicle data in non-volatile memory. All external inputs and internal vehicle data are scanned 50 times a second, then processed, stored and used by the system. The system will also continually test itself for operational failures and alert the driver if necessary. The radar, with microprocessor that can be programmed to fit various driver preferences, will be a dynamic instrument that will extend a driver's capability.

Figures 2, 3:
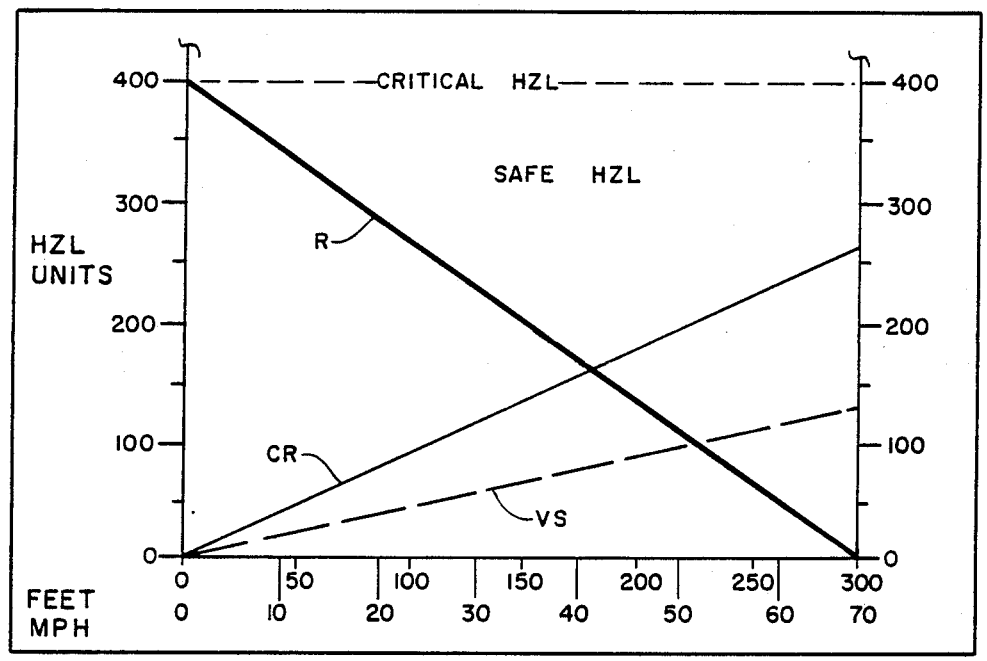
FIG. 2 is a line graph showing of the headway control algorithm of the present invention.
FIG. 3 is a chart showing the dynamic safety margin for various input conditions.

FIG. 2 is a line graph presentation of the internal operation of the radar signal processor 26. The Figure shows a safe zone of vehicle operation and a critical or hazard level (HZL) positioned above the safe zone. The range R is a measurement of the distance from the radar to the object the antenna sees. The range is in feet. In the preferred embodiment, the danger value of the range in the algorithm, hereinafter explained in greater detail, is 50% of the maximum value of the safe zone. CR is the closing rate. The closing rate is the relative speed difference between the antenna and the target. The closing rate is in MPH. In the preferred embodiment, the danger value given the closing rate is 33% of the maximum value of the safe zone. VS is the forward speed of the vehicle in MPH. In the preferred embodiment, the vehicle forward speed is valued at about 17% of the value of the maximum value of the safe zone. The Y or vertical axis of the graph of FIG. 2 is sectioned off in hazard level units. It can been seen that the safe zone extends to approximately 400 units and the critical or hazard zone extending from the 400 unit level in a positive direction toward the top of the figure. The X or horizontal axis of the graph of FIG. 2 is shown with two values, namely feet and MPH. The algorithm values assigned to the various signals can be seen by their positions or angles on the graph.

OPERATION OF THE HEADWAY CONTROL LOGIC OF RADAR SYSTEM

In simple terms, the headway control zone represents the space or distance the operator of a vehicle needs in the front of the vehicle to stop the vehicle or regain any loss of control thereof. Since vehicles are continuously turning in various speeds and directions as they are guided through a moving and stationary object environment, this complex motion must be taken into account in all warning decisions in various situations.

The key to the expert radar system of the invention is a continuously changing algorithm that can always distinguish between a safe and a dangerous situation. The degree of safety or danger can be thought of as a measure of hazard level (HZL). The critical hazard level is determined by the total value of all major factors in the algorithm. Additionally, a dynamic algorithm allows differentiation between many different hazard levels.

With the control zone logic, the expert radar system of the invention can determine any hazard level within the control zone. The major components of the control zone logic are described below.

Referring now specifically to FIG. 2. Range R is a measurement of the distance in feet between the antenna and the object of concern, referred to as the target. Range, in feet, is weighted by the radar system at about 50% of the maximum value of the safe zone (see line R). Closing rate VS is the relative speed difference between the antenna and the target, which may be moving or stationary. The closing rate, in MPH, is weighted at about 33% of the value of the algorithm (line CR). Vehicle speed VS is the speed that the vehicle is moving. Vehicle speed, in MPH, is weighted at about 17% of the value of the algorithm (line VS). Driving modifiers DMs are related to the operation of the vehicle, and what the vehicle operator is doing in traffic. Since the radar environment is constantly changing, DMs are specifically applied to adapt the radar's control logic to accommodate these vehicle driving situations. Specifically, the DMs include factors such as turning as a function of vehicle speed, slow closing rates, vehicle speed, status of the brake pedal, ie. whether the operator is braking or not, and the target direction. These inputs, along with other processor generated modifiers, are used to fine tune the algorithm in order to yield the appropriate output for a driving scenario. All of the DMs, as weighted, may range from +15% to −30% of the maximum value of the safe zone (+ for dangerous conditions and − for safe conditions). When the vehicle is going straight in a normal situation, the DM value is close to zero. As noted on the graph of FIG. 2, the maximum level of the safe zone in the preferred embodiment is 400 units. The radar system of the invention also has the capability of changing this maximum level of the safety zone either upwardly in extreme safe conditions, ie. straight roads with minimal or no objects to be concerned with, or extremely hazardous conditions where the maximum value of the safety zone can be reduced to, for example to 350 units. These changes can be performed by the vehicle operator by manual switching or the like.

When the ordinate value units of the range R, closing rate CR and vehicle speed VS are chosen separately and then added together, the total will yield the value of the hazard level. (Please refer to FIG. 1, page 7.) Hazard levels are considered safe under 400 units and dangerous above 400 units. (The DM value has been omitted for clarity.) The formula for the HZL is: $HZL = R + CR + VS \pm DM$. For working examples let $DM = 0$.

A safer driving margin can be maintained if several key factors are controlled. To establish an appropriate safety margin, we must, in this case, weigh and combine two of the major inputs to yield the desired safety or range margin (See FIG. 3). The dynamic safety margin table shows vehicle speed (VS) along the left vertical edge and closing rate (CR) along the top. At the intersection point of any VS and CR, the safe distance (R) that should be maintained for a given set of conditions is shown. For example, a situation where VS and CR are both 40 MPH (going 40 MPH into a stationary object) yields a range R on the diagonal line of 171 feet. The table of margins can be used for any speed up to 70 MPH and any range up to 300 feet, and for anything form tailgating to high closing rate situations. The diagonal Line R represents the stopping distance needed if you are going toward a stationary object, such as a parked car. If the other car is moving in the same direction as you are, and at the same speed, the safe following distance is shown toward the eft edge. If you are going slow and the other vehicle is rapidly approaching you, the warning range will be shown in the upper right of the table. In addition, the needed or desired range values can be scaled up or down as much as 100 feet for different vehicle and driving situations For example, the algorithm is as follows: HZL (hazard level) $= R + CR + Vs + $ or $- DMs$.

For example if R was 200, Cr was 100 units, VS was 90 units, DMs were 0 and the maximum level of the safe zone was 400, the hazard level would be in the safe zone, ie. 390. On the other hand if the maximum level o the safe zone were 350 then the hazard level would be in the danger or critical zone at which time the radar would emit voice warnings and or visual warnings of collision with an object. In the example above, if VS were 110 and the DMs was $-15$ units, as in turning away or stopping, the hazard level would remain in the safe zone, ie. 395 units and the radar system would not react.

The operator warning device 38 is an audio sounding device which changes frequency or intensity or produces the actual volume and tones of a human voice programed to simulate the fear that a normal person would have under certain levels of potentially dangerous conditions. For example, a soft voice is heard when a possibility of danger only remotely exists requiring normal operator evasive action, ie. slowing down, stopping, turning in a causal manner, and a yell or shout when the distance to an object has decreased to a degree that immediate evasive action is required to prevent impact with an object. The volume level or excitement level in the voice at various different levels of apparent danger vary as would the voice of a person seeing the same conditions as seen by the radar. The use of a voice as the driver warning is preferred because the voice can simulate the various actual fear level of the vehicle operator or passenger within the vehicle when varying levels of dangerous conditions occur. The voice can be reproduced by any convenient known method.

The visual outputs 40 can take many forms, such as, lights having different colors or intensities, visual read out of data, etc.

The weighted values of the constituent items making up the formula of the algorithm are arbitrarily chosen. Consideration is given to the reaction time of the average vehicle operator to dangerous conditions related to closing rate between his vehicle and an object ahead, his vehicle speed and distance to the approaching object of concern. It has been found by actual operation of the radar system of the invention in all traffic conditions by various different vehicle operators having different fear tolerance levels that the weights hereinbefore given to the constituent elements of the formula are representative of the required parameters for expected radar performance for average vehicle operators. The weight % values given to the various constituent elements of the algorithm can be varied to accommodate extreme vehicle operator fear tolerance levels as required to provide sufficient operator notice to accomplish evasive or other means to reduce the danger level.

The above embodiment of a radar system of this invention is merely descriptive of the principles and is not intended to or to be considered as limiting. The scope of this invention instead shall be determined from the scope of the following claims including their equivalents.

What is claimed is:

1. A radar system for use in a vehicle comprising:
   an FM CW radar producing range and closing rate signals between said vehicle and an object;
   vehicle means for producing a signal relating to the speed of said vehicle;
   a reference signal of a fixed unit value, said range, closing rate and vehicle speed signals each having a maximum unit value which is a percentage of said reference signal unit value; and
   a radar signal processor, said radar signal processor comprises means for summing together the instantaneous unit value of said range, closing rate and vehicle speed and when the total summed value exceeds said fixed unit value of said reference signal said radar system provides an output signal.

2. The invention as defined in claim 1 further comprising a vehicle operator adjustment means for changing the unit value of said reference signal.

3. The invention as defined in claim 1 further comprising a vehicle operator adjustment means for changing the unit value percentage of said range, closing rate and vehicle speed signals.

4. The invention as defined in claim 1 further comprising a vehicle operator adjustment means for changing the unit value of said reference signal and unit value percentage of said range, closing rate and vehicle speed signals.

5. The invention as defined in claim 1 wherein said reference signal is positive.

6. The invention as defined in claim 1 wherein said reference signal has a unit value equal to 100%, said range signal has a unit value equal to approximately 50% of said reference signal, said closing rate signal has a unit value equal to approximately 33% of said reference signal and said vehicle speed has a unit value equal to approximately 17% of said reference signal.

7. The invention as defined in claim 1 wherein said means to sum together said signals is a programed radar signal processor.

8. The invention as defined in claim 1 wherein said output signal is visual.

9. The invention as defined in claim 8 wherein said visual output signal is a plurality of different colored lights.

10. The invention as defined in claim 1 wherein said output signal is audio.

11. The invention as defined in claim 10 wherein said audio sound has a varying intensity depending on the value of said summed signals in excess of the value of said reference signal.

12. The invention as defined in claim 11 wherein said audio sound increases in frequency as said summed signals increase in a positive direction beyond said reference signal.

13. The invention as defined in claim 1 further, comprising operator input means to vary the reference signal level according to environment conditions.

14. The invention as defined in claim 1 further comprising vehicle produced signals for decreasing said effective maximum level of said summed signals.

15. The invention as defined in claim 1 further comprising vehicle produced signals for increasing said maximum level of said summed signals.

16. The invention as defined in claim 14 wherein said vehicle signals for decreasing the said effective maximum level of said summed signals include signals related to operator vehicle braking.

17. The invention as defined in claim 14 wherein said vehicle produced signals include signals related to vehicle turning signals.

18. The invention as defined in claim 1 wherein said radar signal processor additionally comprises circuit means for processing the signals in the following manner said reference signal is compared with the summed value of said range, closing rate and vehicle speed signals according to the following formula, when HZL is greater than R+CR+VS+ or DM a safe vehicle zone exists wherein HZL is the maximum hazard level allowable within a safe zone, R is a percentage of the value of HZL and equals the range of the object, CR is a percentage of the value of HZL and is the closing rate to that object, VS is a percentage of the value of HZL and is the vehicle speed and DM is an + or − percentage of the value of HZL and is a vehicle condition and when R+Cr+ or −DM is greater than the value of HZL the vehicle is in a an unsafe condition.

* * * * *